United States Patent
Su et al.

(10) Patent No.: US 8,884,904 B2
(45) Date of Patent: Nov. 11, 2014

(54) TOUCH PANEL APPARATUS, SYSTEM AND OPERATION METHOD THEREOF

(71) Applicants: Tzung-Min Su, Hsin-Chu (TW); Chih-Hsin Lin, Hsin-Chu (TW); Han-Ping Cheng, Hsin-Chu (TW); Ming-Tsan Kao, Hsin-Chu (TW)

(72) Inventors: Tzung-Min Su, Hsin-Chu (TW); Chih-Hsin Lin, Hsin-Chu (TW); Han-Ping Cheng, Hsin-Chu (TW); Ming-Tsan Kao, Hsin-Chu (TW)

(73) Assignee: PixArt Imaging Incorporation, R.O.C., Hsin-Chu (TW)

( * ) Notice: Subject to any disclaimer, the term of this patent is extended or adjusted under 35 U.S.C. 154(b) by 137 days.

(21) Appl. No.: 13/624,815

(22) Filed: Sep. 21, 2012

(65) Prior Publication Data

US 2014/0085212 A1    Mar. 27, 2014

Related U.S. Application Data

(63) Continuation-in-part of application No. 13/272,410, filed on Oct. 13, 2011, now Pat. No. 8,780,042.

(30) Foreign Application Priority Data

Oct. 20, 2011   (TW) .............................. 100138050 A

(51) Int. Cl.
    *G06F 3/041* (2006.01)
    *G01C 9/00* (2006.01)
    *G01C 17/00* (2006.01)
    *G01C 19/00* (2013.01)

(52) U.S. Cl.
    USPC ........................................... 345/173; 702/151

(58) Field of Classification Search
    USPC .......................................................... 345/173
    See application file for complete search history.

(56) References Cited

U.S. PATENT DOCUMENTS

| 4,782,328 A | 11/1988 | Denlinger |
| 7,689,381 B2 * | 3/2010 | Lin et al. ........................ 702/151 |
| 2010/0110020 A1 * | 5/2010 | Reeves et al. ................. 345/173 |

FOREIGN PATENT DOCUMENTS

TW    2010/03277    10/2008

* cited by examiner

*Primary Examiner* — Charles V Hicks
(74) *Attorney, Agent, or Firm* — Tung & Associates

(57) ABSTRACT

The present invention discloses a touch panel apparatus, system and an operation method using for the same system. The apparatus recognizes a track of an object for executing a corresponding gesture function, and it includes: a touch control surface for the object to move on or above to form the track; at least one image sensor for capturing a plurality of continuous pictures including images of the object; and a processor for obtaining a plurality of displacement vectors according to changes in positions of the images of the object, comparing the displacement vectors with a set of basic vectors to obtain a code or a set of codes, and recognizing the code or the set of codes to execute the corresponding gesture function.

35 Claims, 5 Drawing Sheets

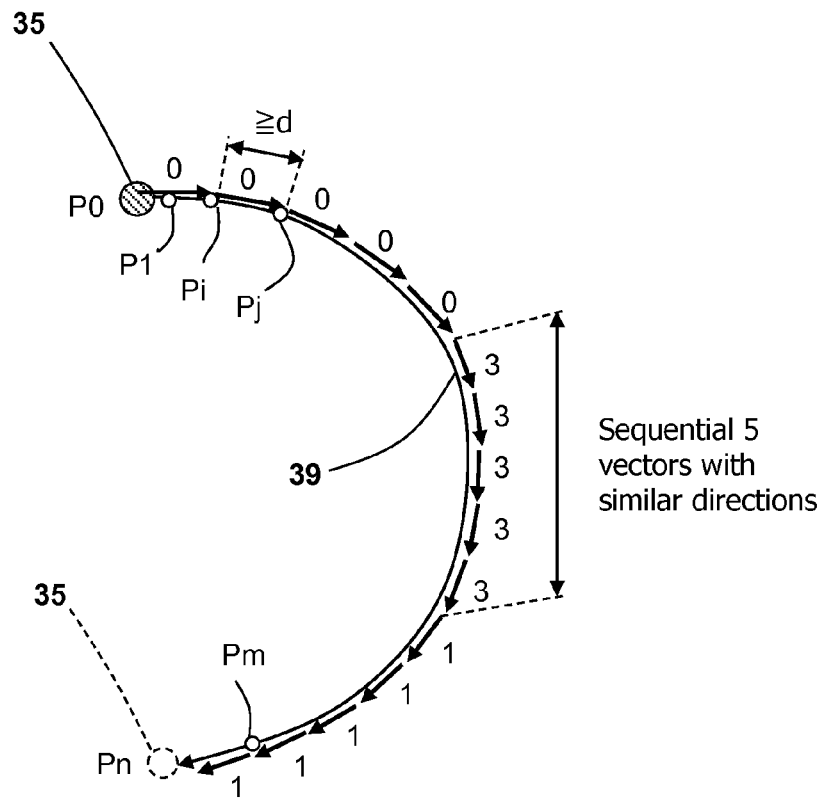
Fig. 4B
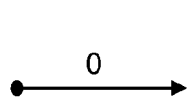
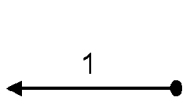
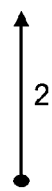
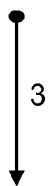
Fig. 5A     Fig. 5B     Fig. 5C     Fig. 5D

TOUCH PANEL APPARATUS, SYSTEM AND OPERATION METHOD THEREOF

CROSS REFERENCE

The present invention claims priority to TW 100138050, filed on Oct. 20, 2011. The present invention is a continuation-in-part application of U.S. Ser. No. 13/272,410, filed on Oct. 13, 2011.

BACKGROUND OF THE INVENTION

1. Field of Invention

The present invention relates to a touch panel apparatus, a touch panel system, and an operation method thereof, in particular to such touch panel apparatus, touch panel system and operation method which analyze the track of an object and code it for executing a corresponding gesture function.

2. Description of Related Art

Touch screen apparatuses are a kind of interactive apparatuses for users to directly and intuitively operate some application software on screen. There are various types of touch screen apparatuses such as capacitive, resistive, optical, and ultrasonic touch panels. The application is illustrated by means of optical touch panel as examples below, but the present invention is not limited to the optical touch panels.

FIG. 1 shows a prior art optical touch panel system 1 which is disclosed by U.S. Pat. No. 4,782,328. As shown in FIG. 1, the optical touch panel system 1 comprises two sensors 11 for capturing the images of an object 13 on a touch control area 12. A processor 14 is coupled to the two sensors 11, and calculates the sensing paths 15 linking the object 13 with the two sensors 11 by analyzing the images outputted by the sensors 11. The processor 14 also calculates the coordinates of the position of the object 13 according to the sensing paths 15. This optical touch panel system 1 requires two sensors 11 and therefore its cost is high.

FIG. 2 shows another prior art optical touch panel system 2 disclosed by Taiwanese Patent Publication No. 201003477, counterpart U.S. Pat. No. 7,689,381 B2. The optical touch panel system 2 comprises a mirror 21, two light sources 22, an image sensor 23 and a processor 24. The mirror 21 and the two light sources 22 are located around a touch control area 28. The mirror 21 is used to reflect the object 25 to generate a mirror image 26 of the object 25. The image sensor 23 captures the image of the object 25 and the mirror image 26. The processor 24 analyzes the sensing paths 27 passing the image of the object 25 and the mirror image 26, and calculates the coordinates of the object 25 according to the two sensing paths 27. The optical touch panel system 2 only needs one image sensor 23, and thus the cost is reduced.

Both of the foregoing optical touch panel systems (1, 2) can recognize the track of the object (which may be a finger or a device) and executes a corresponding gesture function. However, the prior art systems sequentially outputs the coordinates of the images of the object 25 to be processed by an application program, and because the amount of output data is large, a large transmission bandwidth is required. Furthermore, the application program needs to analyze the data to interpret its content; the calculation is complicated and the response time for identifying a gesture and executing a corresponding command is delayed.

In view of above, the present invention overcomes the foregoing drawbacks by providing a touch panel apparatus, a touch panel system, and an operation method which analyze the track of an object and code it for executing a corresponding gesture function. The data in association with the track of the object (a device or a finger) can be simplified in the front end of the operation, and this reduces the complexity of calculation. Thus, the system is more responsive to the gesture.

SUMMARY OF THE INVENTION

An objective of the present invention is to provide a touch panel apparatus and a touch panel system having improved operation speed in response to a gesture.

Another objective of the present invention is to provide an operation method of a touch panel system.

To achieve the foregoing objectives, in one aspect, the present invention provides a touch panel apparatus. The apparatus recognizes a track of an object to execute a corresponding gesture function. It comprises: a touch control surface for the object to move on or above to form the track; at least one image sensor for capturing a plurality of continuous pictures including images of the object; and a processor for obtaining a plurality of displacement vectors according to changes in positions of the images of the object, comparing the displacement vectors with a set of basic vectors to obtain a code or a set of codes, and recognizing the code or the set of codes to execute the corresponding gesture function.

In one embodiment, the processor performs the steps of: designating the coordinates of the image of the object in a first one of the pictures as a start point; sequentially finding a plurality of points each having a distance to a previous point which is over or equal to a threshold distance along the track of the object; and obtaining the displacement vectors according to each two adjacent points.

In one embodiment, the set of basic vectors includes four unit vectors of left, right, up and down.

In the foregoing embodiment, the set of basic vectors further includes four unit vectors of upper left, upper right, lower left and lower right.

In one embodiment, each of the basic vectors is assigned a code.

In the foregoing embodiment, preferably, the processor performs the steps of: comparing each of the displacement vectors with each basic vector, finding a basic vector with a direction identical or closest to the direction of the displacement vector, and replacing the displacement vector with the code assigned to the basic vector having the identical or closest direction, so as to obtain the code or the set of codes.

In one embodiment, when a same code sequentially appears a number of times so that there are a plurality of sequential same codes, and the number of times is equal to or over a threshold number of times, the processor simplifies the sequential same codes as one code.

In the foregoing embodiment, preferably, the processor consolidates the set of codes into a track code, and executes the corresponding gesture function which is corresponding to the track code.

In the foregoing embodiment, preferably, a correlation of track codes and corresponding gesture functions is listed in a table.

In one embodiment, the number of the image sensors is two.

In yet another aspect, the present invention provides an operation method of a touch panel system recognizing a track of an object for executing a corresponding gesture function, comprising: moving the object or above a control surface to form the track; capturing a plurality of continuous pictures including images of the object; obtaining a plurality of displacement vectors according to changes in positions of the images of the object; comparing the displacement vectors with a set of basic vectors to obtain a code or a set of codes; and recognizing the code or the set of codes to execute the corresponding gesture function.

In yet another aspect, the present invention provides a touch panel system for recognizing a track of an object to execute a corresponding gesture function, comprising: a sensing apparatus, including: at least one image sensor for capturing a plurality of continuous pictures including images of the object; and a processor for obtaining a plurality of displacement vectors according to changes in positions of the images of the object; and a host comparing the displacement vectors with a set of basic vectors to obtain a code or a set of codes and recognizing the code or the set of codes to execute the corresponding gesture function.

In yet another aspect, the present invention provides a touch panel system for recognizing a track of an object to execute a corresponding gesture function, comprising: a sensing apparatus for detecting a plurality of positions of the object on or above a touch control surface; a processor obtaining a plurality of displacement vectors according to changes in positions of the images of the object; and a host comparing the displacement vectors with a set of basic vectors to obtain a code or a set of codes and recognizing the code or the set of codes to execute the corresponding gesture function In one embodiment, the sensing apparatus is an optical sensor, a capacitive sensor, a resistive sensor, or an ultrasonic sensing device.

The objectives, technical details, features, and effects of the present invention will be better understood with regard to the detailed description of the embodiments below, with reference to the drawings.

BRIEF DESCRIPTION OF THE DRAWINGS

FIG. 4B is a schematic diagram illustrating an example of analysis and coding of the track of the object in FIG. 3.

FIGS. 5A-5J, 5L-5S are schematic diagrams illustrating the tracks and codes corresponding to gesture functions.

DESCRIPTION OF THE PREFERRED EMBODIMENTS

Figure 1:
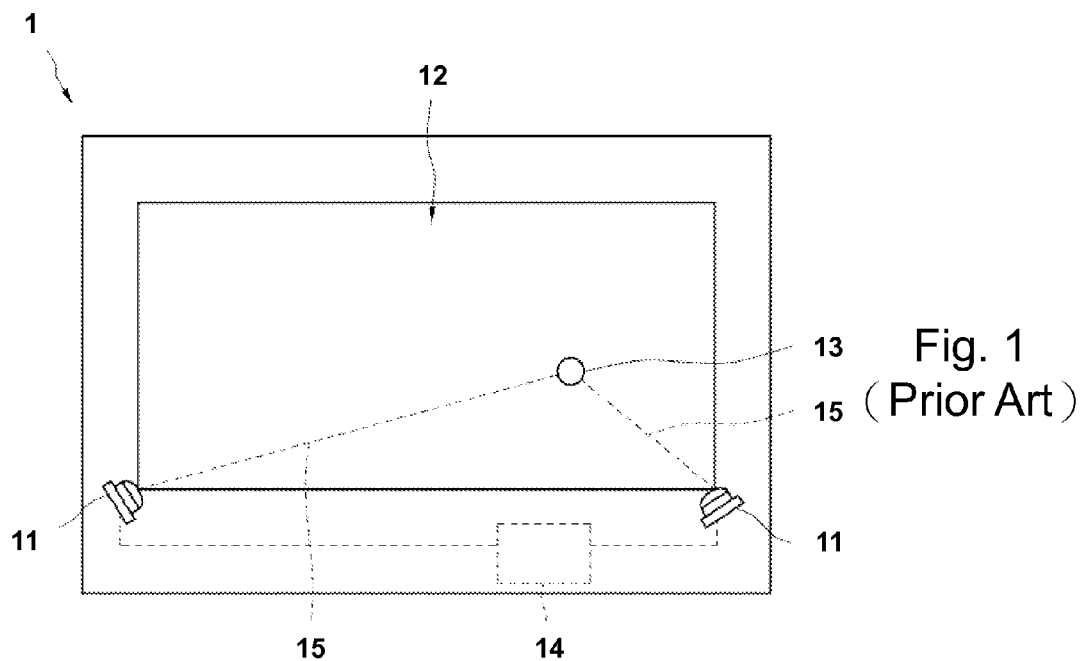
FIG. 1 shows a prior art optical touch panel system.
Figure 2:
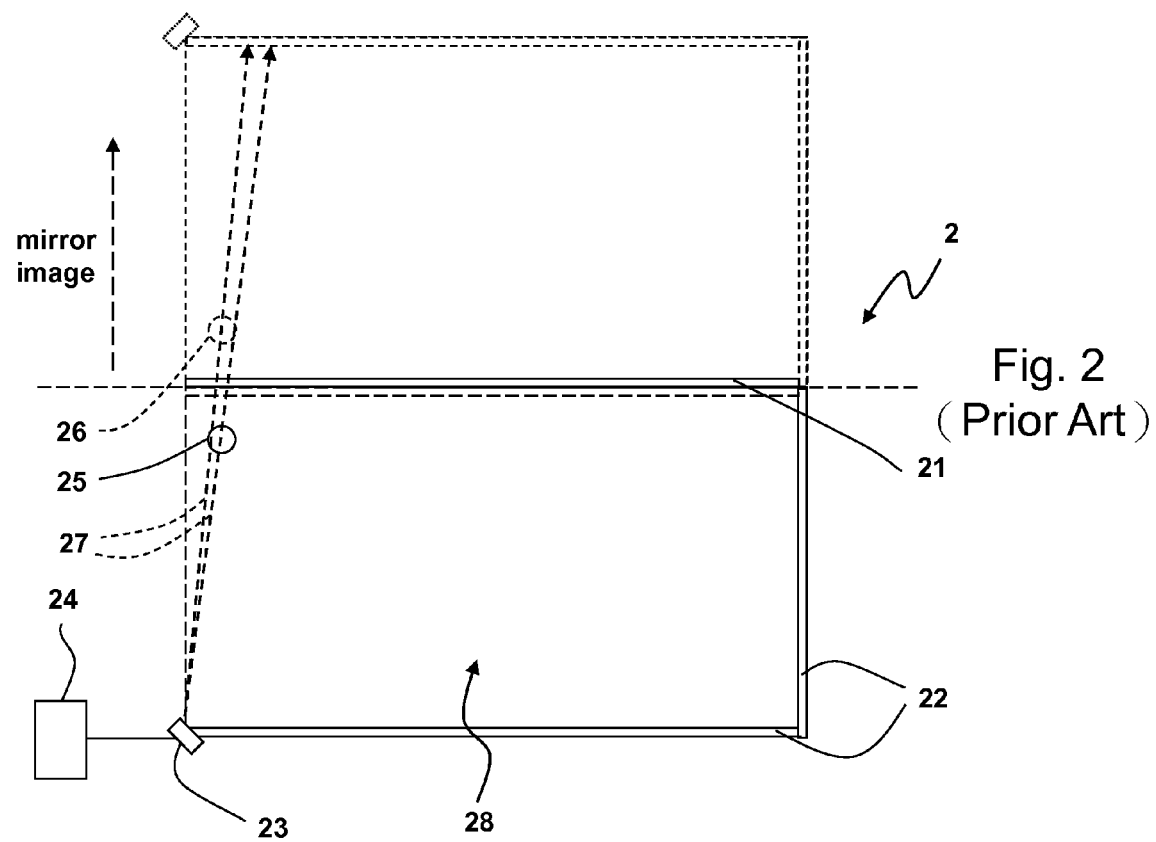
FIG. 2 shows another prior art optical touch panel system.

The present invention relates to a touch panel system and the operation method which improve the conventional touch panel systems in FIGS. 1 and 2. The present invention is applicable to not only optical but also capacitive, resistive, and ultrasonic touch panel systems. That is, the image sensors in the below embodiments can be replaced by capacitive sensors, resistive sensors, ultrasonic sensing devices or other optical devices.

Figure 3:
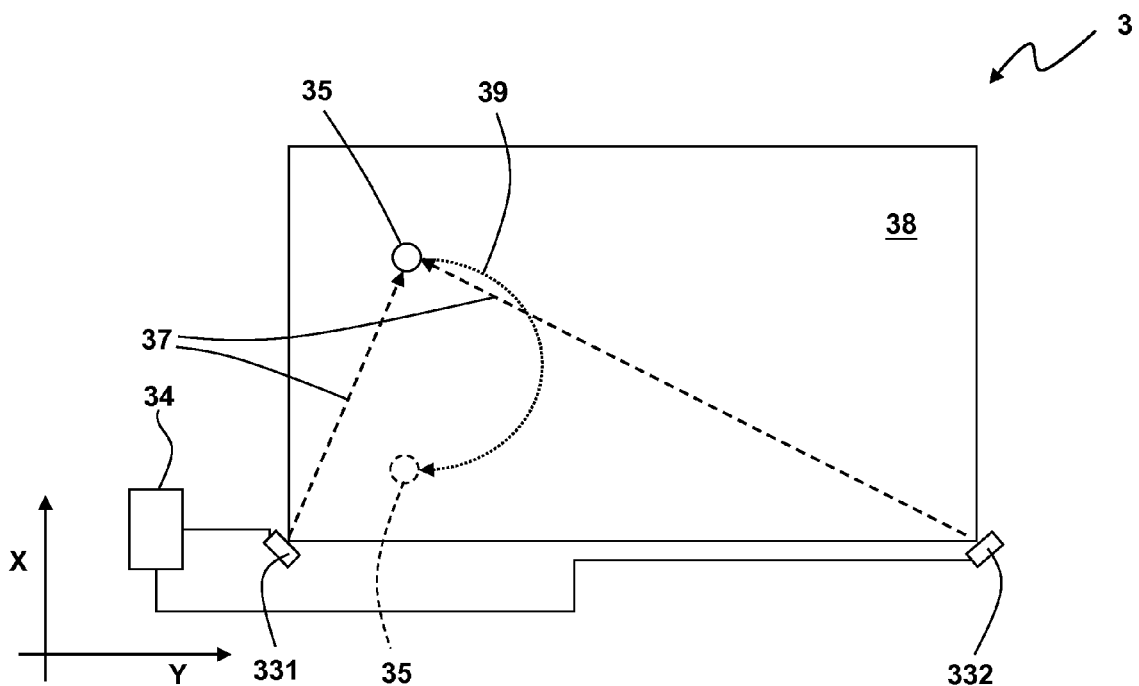
FIG. 3 is a schematic diagram illustrating an embodiment of an optical touch panel system of the present invention.

FIG. 3 is a schematic diagram illustrating an embodiment of an optical touch panel system of the present invention. When an object 35 (e.g. a finger or a stylus pen) touches the touch control surface 38 of an optical touch panel system 3, the system can calculate the coordinate of the object 35 to position it. (In fact, as long as the touch panel system can sense the movement of the object 35 on or above it, the object 35 does not necessarily have to physically contact the touch control surface 38. The term "touch" in the context of the specification should be interpreted in a broad sense to mean that the object 35 is sensibly close to the touch control surface 38.) The optical touch panel system 3 comprises a first image sensor 331, a second image sensor 332, and a processor 34. The system 3 can recognize the track of the object 35 on or above the touch control surface 38 to execute a corresponding gesture function. As shown in this figure, the object 35 slides from the upper start point towards the right along the semicircular track 39, and moves down till the end point. The present embodiment is shown to utilize two image sensors, but the present invention is not limited to the shown embodiment. The system can have only one image sensor. As mentioned above, the image sensors can be replaced by capacitive sensors, resistive sensors, ultrasonic sensing devices, or other optical devices, as long as the system can detect the positions of multiple points in the track 39. The position detection and calculation associated with different types of sensing devices are well known and therefore are not redundantly explained herein.

The processor 34 is coupled to the two image sensors (331, 332), and determines the sensing paths 37 respectively linking the two image sensors (331, 332) to the object 34 by analyzing the images generated by the image sensors (331, 332). Moreover, according to the sensing paths 37, the coordinates of the position of the object 35 can be obtained. That is, the coordinates of the object 35 is the intersection of the sensing paths 37.

When the user moves the object 35 from the start point to the end point along the semicircle of the track 39, the two image sensors (331, 332) can continuously capture multiple frames including the images of the object 35. The processor 34 recognizes the track 39 by tracing the images of the object 35 in the frames from the starting position (the point P0 in the upper position) obtained from a first image in the images of the object 35, and executes a corresponding gesture function.

Figure 4A:
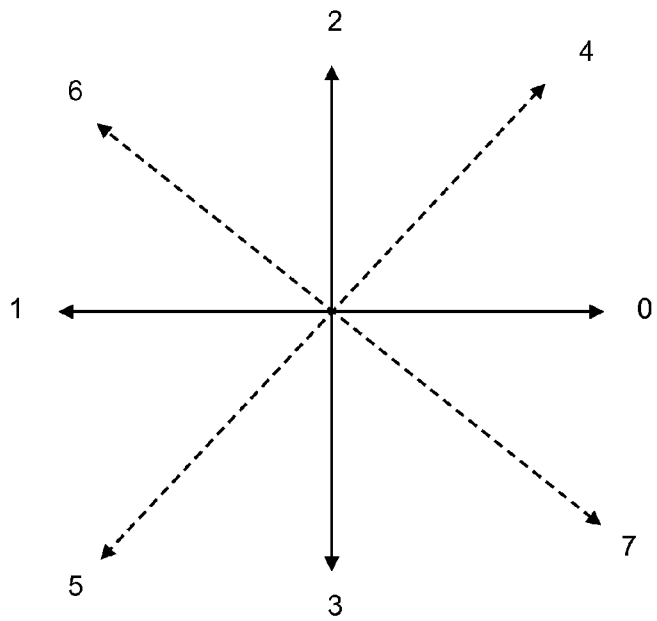
FIG. 4A is a schematic diagram illustrating an embodiment of basic vectors of the present invention.

The present invention obtains multiple displacement vectors according to the variation of the positions of the object 35 on the track. The displacement vectors are compared with a set of basic vectors to obtain a code or a set of codes, and the code or the code set is recognized to determine the corresponding gesture function to be executed. In another embodiment, the host 3a of the optical touch panel system 3 is capable of comparing the displacement vectors with the set of basic vectors to generate the code or the code set, and the code or the code set is recognized to determine the corresponding gesture function to be executed. In this case, the processor 34 only needs to output the displacement vectors. FIG. 4A is a schematic diagram illustrating an embodiment of basic vectors of the present invention. This embodiment summarizes the vectors of the track to eight basic vectors respectively of eight directions, left, right, up, down, upper left, upper right, lower left and lower right. Each basic vector is assigned a code number, that is, 0 to 7. The present invention is not limited to the eight directions in the embodiments. For example, four of the eight directions can be selected as the set of basic vectors. For another example, the space between the eight directions can be further divided to obtain 16 radial directions, or even more radial directions, as the set of basic vectors.

FIG. 4B shows a schematic diagram illustrating the analysis and coding of the track of the object in FIG. 3. The track 39 of the object 35 includes multiple points having coordinates (P0, P1, . . . , Pn), which are the positions of the object 35 obtained from the pictures. First, the processor 34 finds the starting point, which is the point P0 in this example. Then, the point P0 is taken as a basis point and the coordinates of the point Pi is found by moving forward along the track 39 with a distance over or equal to a threshold distance d. That is, the distance between the basis point (start point P0) and the point Pi is over or equal to the threshold distance d. The point Pi is taken as a new basis point. Similarly, the coordinates of the point Pj is found by moving forward along the track 39 with a distance over or equal to a threshold distance d. In light of the foregoing rules, multiple points (P0, Pi, Pj, . . . , Pm, Pn) can be obtained. Displacement vectors ($\overrightarrow{P0Pi}, \overrightarrow{PiPj}, \ldots, \overrightarrow{PmPn}$) can also be obtained according to each two adjacent points. In this example, each of the displacement vectors ($\overrightarrow{P0Pi}, \overrightarrow{PiPj}, \ldots, \overrightarrow{PmPn}$) is compared with four basic vectors (0, 1, 2, 3) in FIG. 4A. (In another embodiment, the displacement vectors can be compared with the eight basic vectors). A set of codes (0, 0, 0, 0, 0, 3, 3, 3, 3, 3, 1, 1, 1, 1, 1) is obtained according to the similarity between each displacement vector and one of the basic vectors. The set of codes is recognized to identify a corresponding gesture function, and the corresponding gesture function such as page scrolling, display rotation, pulling down a menu, etc. is executed. In a preferred embodiment, the set of codes is further simplified. When the same code sequentially appears in the codes for a number of times which is equal to or over a threshold number of times, the sequential same codes can be simplified as one code. For example, there are five segments with the same code 3 in the track 39. Assuming that the threshold number of times is 5, the five same codes 3 can be simplified as one code 3. According to this rule, the set of codes is simplified as (0, 3, 1). It can be further simplified as a track code 031 which corresponds to a clockwise semi-rotation. Through a look-up table or a mapping rule which can be predefined and referred to by the processor 34 or the host 3a, the clockwise semi-rotation represented by the track code 031 is mapped to a corresponding gesture function.

Figure 5E:
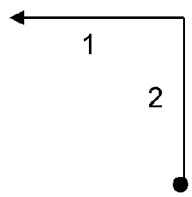
Figure 5F:
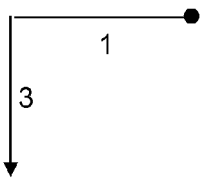
Figure 5G:
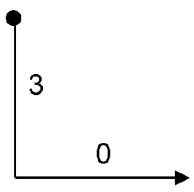
Figure 5H:
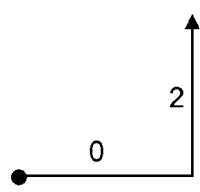
Figure 5I:
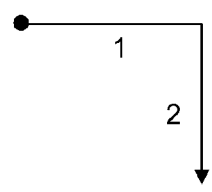
Figure 5J:
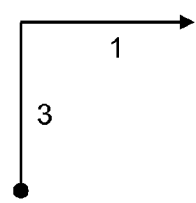
Figure 5L:
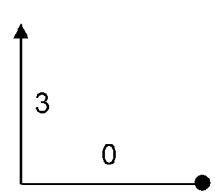
Figure 5M:
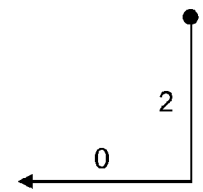
Figure 5N:
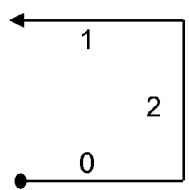
Figure 5O:
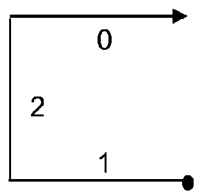
Figure 5P:
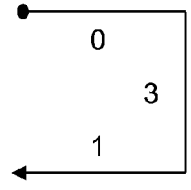
Figure 5Q:
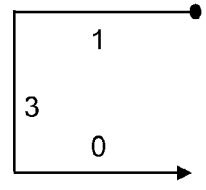
Figure 5R:
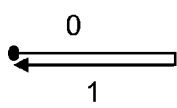
Figure 5S:
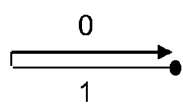

FIGS. 5A-5S are schematic diagrams illustrating the tracks and codes corresponding to gesture functions. FIGS. 5A-5D respectively show tracks and their codes corresponding to straight movements. For example, code 0 represents a horizontal rightward movement and can be mapped to a predefined gesture function. FIGS. 5E-5M respectively show tracks and their codes corresponding to 90 degree rotations. For example, the codes 21, 13, 30, 02 all represent 90 degree counterclockwise rotation, and the codes 12, 31, 03, 20 all represent 90 degree clockwise rotation.

FIG. 5N-5S respectively show the tracks and their codes corresponding to 180 degree rotation. For example, the codes 021, 130 represent 180 degree counterclockwise rotation, and the codes 031, 120 all represent 180 degree clockwise rotation. Different codes can be mapped to the same gesture function or different gesture functions. For example, all 90 degree counterclockwise rotation can be mapped to the same gesture function, or each mapped to a different gesture function.

Figure 6:
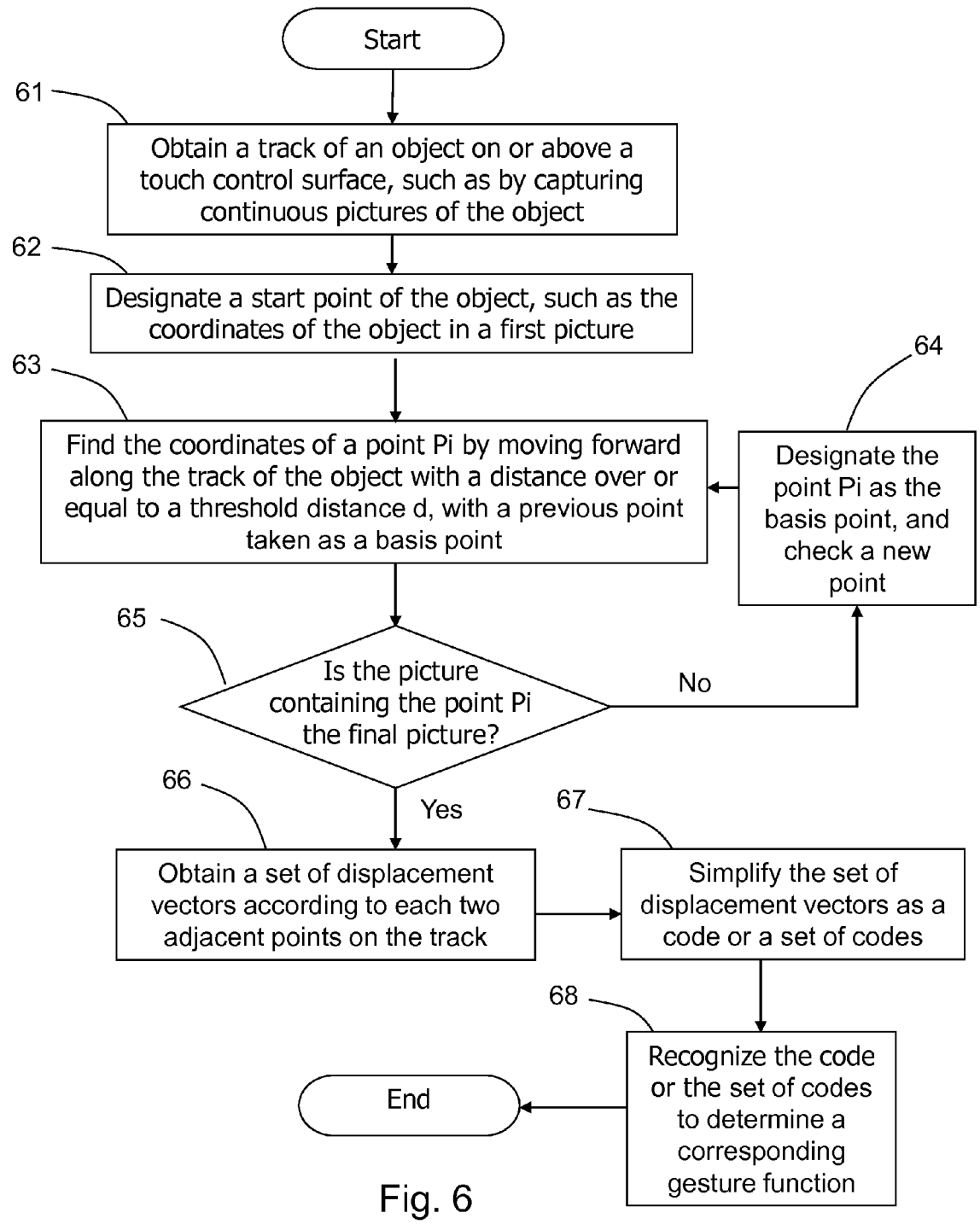
FIG. 6 is a flow chart illustrating the operation method of the optical touch panel system of the present invention.

FIG. 6 is a flow chart illustrating the operation method of the present invention by taking an optical touch panel system as an example. As explained, the present invention can be applied to other types of touch panel systems, and in the latter cases the information (such as the start point) of the object is obtained by means other than optical means. As shown in Step 61, a track of an object on or above a touch control surface is obtained, such as by capturing continuous pictures of the object. In step S62, the coordinates of the object that first appear in the pictures (or the object in the first picture), is designated as a start point (e.g., P0). In step S63, the coordinates of the point (e.g., Pi) is found by moving forward along the track with a distance over or equal to a threshold distance d, with a previous point (the start point in the present case) taken as a basis point. That is, the distance between the start point P0 and the point Pi is over or equal to the threshold distance d. As shown in Step 65, if the picture containing the point Pi is the final picture containing the object, that is, the point Pi is the end point of the track, and the process flow jumps to Step 66; otherwise, the process flow jumps to Step 64. In Step 64, the point Pi is taken as a basis point, and the process flow now checks a new point and goes back to step S63. Similarly, the coordinates of a point (e.g., Pj) is found by moving forward along the track 39 with a distance over or equal to a threshold distance d, with the previous point (the point Pi in the present case) taken as the basis point, till the requirement of Step 65 is satisfied. Then the process flow goes to Steps 66 and 67, wherein the displacement vectors can be obtained according to each two adjacent points, and the displacement vectors can be simplified as a code or a set of codes. For example, the set of codes is obtained by comparing the displacement vectors with a set of basic vectors. Finally, the code or the set of codes is recognized and mapped to a corresponding gesture function, such as moving or rotating a graphic display, as shown in Step 68.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the gesture functions and their corresponding tracks and codes can be defined in various ways other than what have been shown by the examples of the foregoing embodiments. As another example, a displacement vector can be calculated immediately after two adjacent points are obtained, that is, the steps S65 can be rearranged after the step S66, or after the step S67; the timing for obtaining a displacement vector is not limited to the sequence shown in the flow chart which is only an example. Thus, the present invention should cover all such and other modifications and variations, which should be interpreted to fall within the scope of the following claims and their equivalents.

What is claimed is:

1. A touch panel system for recognizing a track of an object to execute a corresponding gesture function, comprising:
    a touch control surface for the object to move on or above to form the track;
    at least one image sensor for capturing a plurality of continuous pictures including images of the object; and
    a processor for obtaining a plurality of displacement vectors according to changes in positions of the images of the object, comparing the displacement vectors with a set of basic vectors to obtain a code or a set of codes, and recognizing the code or the set of codes to execute the corresponding gesture function, wherein the processor performs the steps of: designating the coordinates of the image of the object in a first one of the pictures as a start point; sequentially finding a plurality of points each having a distance to a previous point which is over or equal to a threshold distance along the track of the object; and obtaining the displacement vectors according to each two adjacent points.

2. The touch panel system of claim 1, wherein the set of basic vectors includes four unit vectors of left, right, up and down.

3. The touch panel system of claim 2, wherein the set of basic vectors further includes four unit vectors of upper left, upper right, lower left and lower right.

4. The touch panel system of claim 1, wherein each of the basic vectors is assigned a code.

5. The touch panel system of claim 4, wherein the processor performs the steps of: comparing each of the displacement vectors with each basic vector, finding a basic vector with a direction identical or closest to the direction of the displacement vector, and replacing the displacement vector with the code assigned to the basic vector having the identical or closest direction, so as to obtain the code or the set of codes.

6. The touch panel system of claim 1, wherein when a same code sequentially appears a number of times so that there are a plurality of sequential same codes, and the number of times is equal to or over a threshold number of times, the processor simplifies the sequential same codes as one code.

7. The touch panel system of claim 1, wherein the processor consolidates the set of codes into a track code, and executes the corresponding gesture function which is corresponding to the track code.

8. The touch panel system of claim 7, wherein a correlation of track codes and corresponding gesture functions is listed in a table.

9. The touch panel system of claim 1, wherein the number of the image sensors is two.

10. An operation method of a touch panel system for recognizing a track of an object to execute a corresponding gesture function, comprising:
moving the object or above a control surface to form the track;
capturing a plurality of continuous pictures including images of the object;
obtaining a plurality of displacement vectors according to changes in positions of the images of the object, wherein the step of obtaining a plurality of displacement vectors further includes:
designating coordinates of the image of the object in a first one of the pictures as a start point;
sequentially finding a plurality of points each having a distance to a previous point which is over or equal to a threshold distance along the track of the object; and
obtaining the set of displacement vectors according to each two adjacent points;
comparing the displacement vectors with a set of basic vectors to obtain a code or a set of codes; and
recognizing the code or the set of codes to execute the corresponding gesture function.

11. The operation method of a touch panel system of claim 10, wherein the set of basic vectors includes four unit vectors of left, right, up and down.

12. The operation method of a touch panel system of claim 11, wherein the set of basic vectors further includes four unit vectors of upper left, upper right, lower left and lower right.

13. The operation method of a touch panel system of claim 11, wherein each of the basic vectors is assigned a code.

14. The operation method of a touch panel system of claim 13, wherein the step of comparing the displacement vectors with a set of basic vectors includes: comparing each of the displacement vectors with each basic vector to find a basic vector with a direction identical or closest to the direction of the displacement vector, and replacing the displacement vector with the code assigned to the basic vector having the identical or closest direction, so as to obtain the code or the set of codes.

15. The operation method of a touch panel system of claim 10, wherein the step of comparing the displacement vectors with a set of basic vectors includes: when a same code sequentially appears a number of times so that there are a plurality of sequential same codes, and the number of times is equal to or over a threshold number of times, simplifying the sequential same codes as one code.

16. The operation method of a touch panel system of claim 10, further comprising: consolidating the set of codes as a track code.

17. The operation method of a touch panel system of claim 16, wherein the step of recognizing the code or the set of codes to execute the corresponding gesture function includes: finding the gesture function corresponding to the track code.

18. A touch panel system for recognizing a track of an object to execute a corresponding gesture function, comprising:
a sensing apparatus, including:
at least one image sensor for capturing a plurality of continuous pictures including images of the object; and
a processor for obtaining a plurality of displacement vectors according to changes in positions of the images of the object, wherein the processor performs the steps of: designating the coordinates of the image of the object in a first one of the pictures as a start point; sequentially finding a plurality of points each having a distance to a previous point which is over or equal to a threshold distance along the track of the object; and obtaining the displacement vectors according to each two adjacent points; and
a host comparing the displacement vectors with a set of basic vectors to obtain a code or a set of codes and recognizing the code or the set of codes to execute the corresponding gesture function.

19. The touch panel system of claim 18, wherein the set of basic vectors includes four unit vectors of left, right, up and down.

20. The touch panel system of claim 19, wherein the set of basic vectors further includes four unit vectors of upper left, upper right, lower left and lower right.

21. The touch panel system of claim 18, wherein each of the basic vectors is assigned a code.

22. The touch panel system of claim 21, wherein the processor performs the steps of: comparing each of the displacement vectors with each basic vector, finding a basic vector with a direction identical or closest to the direction of the displacement vector, and replacing the displacement vector with the code assigned to the basic vector having the identical or closest direction, so as to obtain the code or the set of codes.

23. The touch panel system of claim 18, wherein when a same code sequentially appears a number of times so that there are a plurality of sequential same codes, and the number of times is equal to or over a threshold number of times, the processor simplifies the sequential same codes as one code.

24. The touch panel system of claim 23, wherein the processor consolidates the set of codes into a track code, and executes the corresponding gesture function which is corresponding to the track code.

25. The touch panel system of claim 24, wherein a correlation of track codes and corresponding gesture functions is listed in a table.

26. The touch panel system of claim 18, wherein the number of the image sensors is 2.

27. A touch panel system for recognizing a track of an object to execute a corresponding gesture function, comprising:
a sensing apparatus for detecting a plurality of positions of the object on or above a touch control surface;
a processor obtaining a plurality of displacement vectors according to changes in positions of the images of the object, wherein the processor performs the steps of:

designating the coordinates of the image of the object in a first one of the pictures as a start point; sequentially finding a plurality of points each having a distance to a previous point which is over or equal to a threshold distance along the track of the object; and obtaining the displacement vectors according to each two adjacent points; and a host comparing the displacement vectors with a set of basic vectors to obtain a code or a set of codes and recognizing the code or the set of codes to execute the corresponding gesture function.

28. The touch panel system of claim 27, wherein the set of basic vectors includes four unit vectors of left, right, up and down.

29. The touch panel system of claim 27, wherein the set of basic vectors further includes four unit vectors of upper left, upper right, lower left and lower right.

30. The touch panel system of claim 27, wherein each of the basic vectors is assigned a code.

31. The touch panel system of claim 30, wherein the processor performs the steps of: comparing each of the displacement vectors with each basic vector, finding a basic vector with a direction identical or closest to the direction of the displacement vector, and replacing the displacement vector with the code assigned to the basic vector having the identical or closest direction, so as to obtain the code or the set of codes.

32. The touch panel system of claim 30, wherein when a same code sequentially appears a number of times so that there are a plurality of sequential same codes, and the number of times is equal to or over a threshold number of times, the processor simplifies the sequential same codes as one code.

33. The touch panel system of claim 32, wherein the processor consolidates the set of codes into a track code, and executes the corresponding gesture function which is corresponding to the track code.

34. The touch panel system of claim 33, wherein a correlation of track codes and corresponding gesture functions is listed in a table.

35. The touch panel system of claim 30, wherein the sensing apparatus is one of an optical sensor, a capacitive sensor, a resistive sensor, or an ultrasonic device.

* * * * *